July 9, 1929. H. DREYER 1,720,036
MEANS FOR INDICATING AT A DISTANCE THE AMPLITUDE
OF MOVEMENTS IN ALTERNATIVE DIRECTIONS
Filed May 3, 1926 3 Sheets-Sheet 1
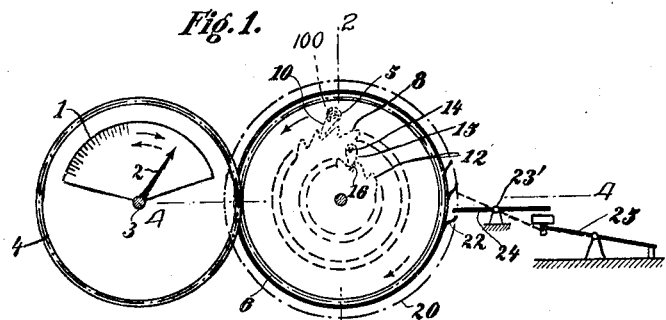
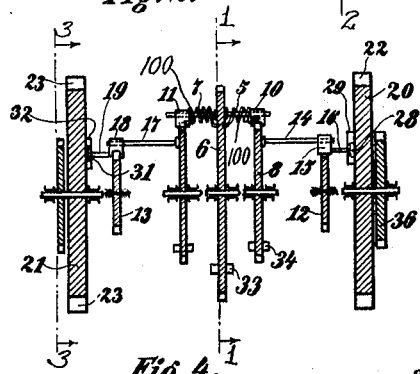
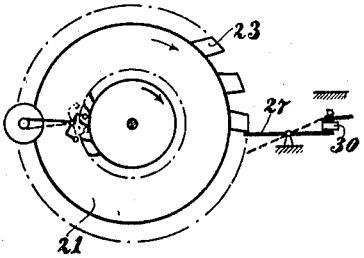
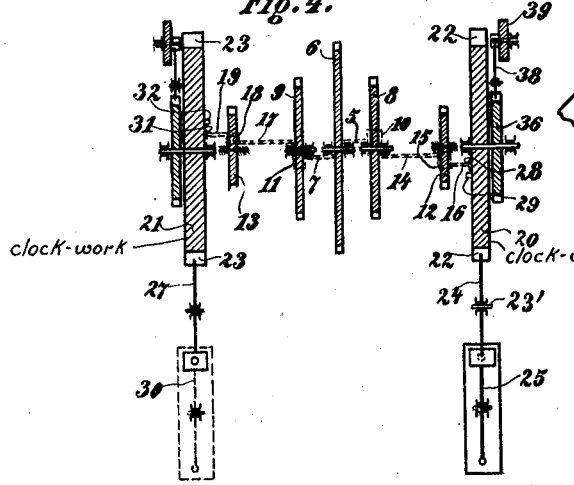
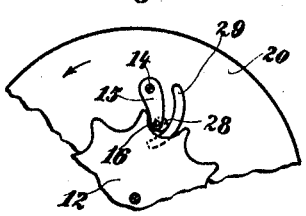
HANS DREYER
INVENTOR
By Otto Munk
his ATTY.

July 9, 1929.                H. DREYER                1,720,036
        MEANS FOR INDICATING AT A DISTANCE THE AMPLITUDE
             OF MOVEMENTS IN ALTERNATIVE DIRECTIONS
                     Filed May 3, 1926        3 Sheets-Sheet 2
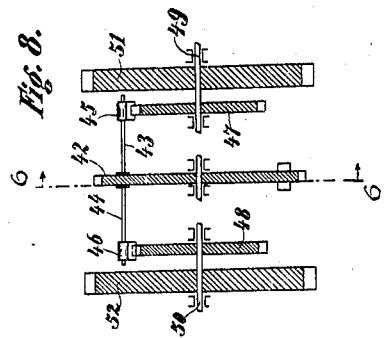
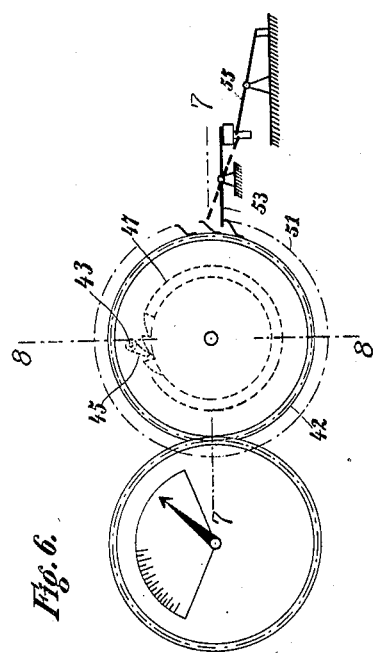
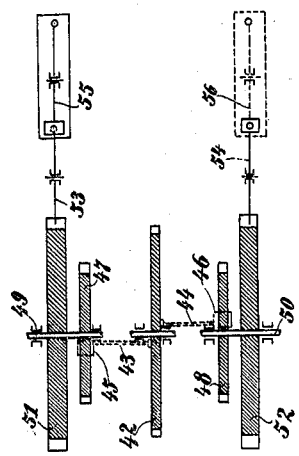
HANS DREYER
  INVENTOR
By
   his ATTY.

July 9, 1929.  H. DREYER  1,720,036
MEANS FOR INDICATING AT A DISTANCE THE AMPLITUDE
OF MOVEMENTS IN ALTERNATIVE DIRECTIONS
Filed May 3, 1926   3 Sheets-Sheet 3
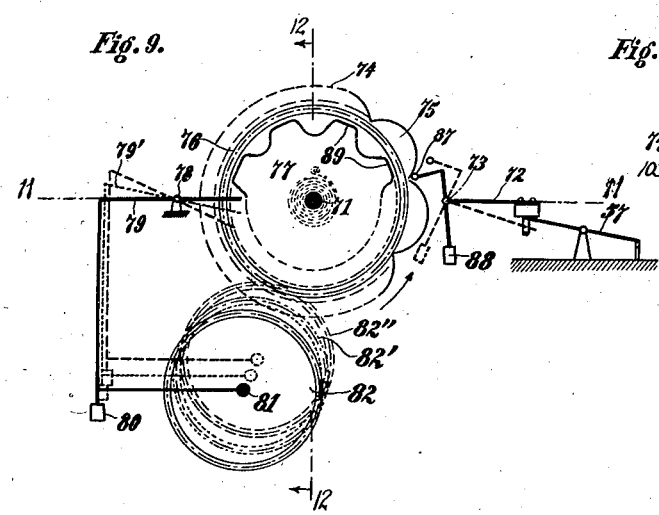
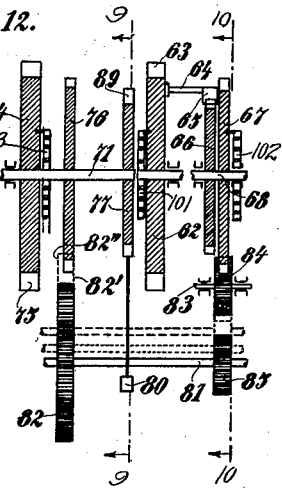
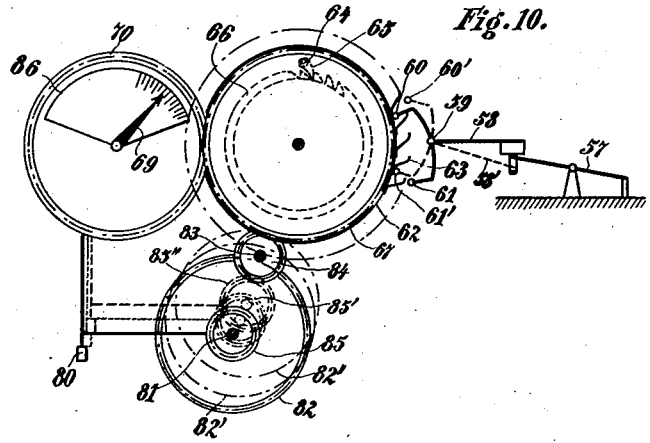
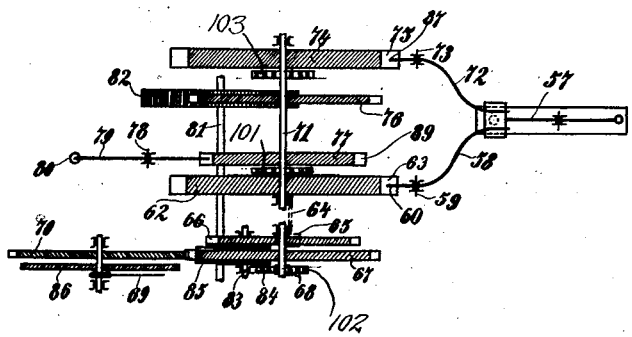
Hans Dreyer
INVENTOR
By
his ATTY.

Patented July 9, 1929.

1,720,036

UNITED STATES PATENT OFFICE.

HANS DREYER, OF MUNICH-HARLACHING, GERMANY.

MEANS FOR INDICATING AT A DISTANCE THE AMPLITUDE OF MOVEMENTS IN ALTERNATIVE DIRECTIONS.

Application filed May 3, 1926, Serial No. 106,290, and in Germany December 18, 1924.

For various purposes it is of great advantage to indicate at a distance the movements of some part of a machine or other apparatus, for example the pointer of a measuring instrument, a convenient method being to transmit distinctive signals by means of electric current or wireless electric transmission.

The object of my invention is to provide an improved method and apparatus for this purpose.

This invention may, for example, be used for signalling to a central station the results of measurements made at different points of a high tension electric distributing system, and for signalling changes of water level and the like.

According to the invention the movement of the device under observation for example the pointer of a measuring instrument, is caused to produce the emission of electric current or wave impulses, the number of impulses being proportional to the amplitude of the movement, and the amplitude of the individual impulses depending on the direction of the movement.

The accompanying drawings illustrate examples of apparatus embodying the invention.

Fig. 1 shows a transmitter driven by clockwork, in section on the line 1—1 of Fig. 2;

Fig. 2 is a section on the line 2—2 of Fig. 1;

Fig. 3 a section on the line 3—3 of Fig. 2, and

Fig. 4 a section on the line 4—4 of Fig. 1;

Fig. 5 shows part of the clockwork mechanism;

Fig. 6 shows a transmitter with direct drive in section on the line 6—6 of Fig. 8.

Fig. 7 is a section on the line 7—7 of Fig. 6 and

Fig. 8 a section on the line 8—8 of Fig. 6;

Fig. 9 shows the receiver in section on the line 9—9 of Fig. 12;

Fig. 10 is a section on the line 10—10 of Fig. 12;

Fig. 11 is a section on the line 11—11 of Fig. 9, and

Fig. 12 a section on the line 12—12 of Fig. 9.

Referring first to Figs. 1 to 5, 1 is a stationary scale, and 2 a pointer fixed to an axle 3, to which is also fixed a gear wheel 4. The axle 3 is rotated by means of mechanism not shown, this being the mechanism of a measuring instrument or mechanism connecting the axle to some machine part whose movements are to be indicated. The wheel 4 is meshed with a gear wheel 6, to which it transmits movements in accordance with the movements of the pointer. The wheel 6 carries a crank pin 5 carrying a pawl 10 which in the course of anti-clockwise rotation of the wheel 6 that is to say in the course of clockwise deflection of the pointer 2, engages a ratchet wheel 8 and rotates it anti-clockwise. The wheel 6 is also provided with a crank pin 7, which carries a pawl 11. The latter in the course of clockwise rotation of the pointer 2, slides over the teeth of a ratchet wheel 9, without imparting rotary movement thereto. The pawls are held in contact with the teeth of the ratchet wheels by means of springs 100, so that the said pawls are prevented from falling out of engagement by gravity. The crank pins and pawls on the wheel 6 are balanced by a counter-weight 33. The shafts of the ratchet wheels 8 and 9 are fitted in their bearings with sufficient friction to bring them to rest immediately upon termination of the pointer movement.

The wheel 8 carries a crank pin 14 balanced by a counterweight 34, and carrying a pawl 15 which, during clockwise deflections of the pointer 2 slides over the teeth of a fixed ratchet wheel 12. The pawl 15 carries near its free end a pin 16 to which is fixed an eccentric collar 28 acting as a stop for a clockwork 20, which rotates anti-clockwise when free. During clockwise rotation of the pointer 2 whether fast or slow, the wheel 8 carries the collar 28 anti-clockwise through an angle proportional to the amplitude of the pointer deflection. Consequently the clockwork 20 is released and rotates at a uniform speed, until a crescent shaped projection 29 which it carries behind the collar 28 strikes the latter and forces the pawl 15 into engagement with the nearest tooth of the stationary ratchet wheel 12. The clockwork 20 is thus locked without affecting the position of the pointer 2. If the latter thereafter makes a further clockwise movement the crank pin 14 is again moved anti-clockwise. The eccentric arrangement of the collar 28 and the crescent shape of the abutment 29 enables the pawl 15 to be withdrawn from the tooth gap of the wheel 12 without exertion of any great amount of force. The clockwork 20 is controlled in known manner by means of an escapement 36, 38, 39 and is provided with teeth for actuating, by means of a lever 24 pivoted at $23^1$, the transmitter key 25 of a telegraphic apparatus, to transmit a number of short current impulses, the number being proportional to the amplitude of the pointer deflection.

In the case of anti-clockwise deflection of the pointer 2 the wheel 8, clockwork 20 and transmitter key 25 remain stationary, inasmuch as in this case the pawl 10 slides over the teeth of the ratchet wheel 8 without imparting movement to it. Any tendency to rotate due to the friction of the pawl 10 upon the wheel 8 is counteracted by the pawl 15, which engages the stationary wheel 12.

On the other hand, anti-clockwise deflection of the pointer 2 causes the crank pin 7, pawl 11, ratchet wheel 9, crank pin 17, pawl 18, ratchet wheel 13, pin 19, eccentric collar 31, crescent shaped stop 32, clockwork 21, teeth 23, lever 27 and transmitter key 30 to transmit another set of current impulses through the telegraph apparatus, these impulses being long, corresponding to the dash signs in the Morse code, and the number thereof being proportional to the amplitude of deflection of the pointer.

In cases where the movements are comparatively uniform and furnish a fair amount of surplus energy, the transmitter device may be simplified as shown in Figs. 6 to 8. The wheel 42, which is rotated anti-clockwise by clockwise deflection of the pointer of the measuring device, rotates the wheel 47 in the same direction by means of a crank pin 43, pawl 45, through an angle corresponding to the amplitude of the pointer deflection. On the same shaft 49 which carries the wheel 47 there is mounted a toothed wheel 51, which when rotating anti-clockwise actuates the transmitter key 55 of the telegraph apparatus by means of a lever 53. During this operation the pawl 46 on the wheel 42, slides on the ratchet wheel 48 without actuating it. Analogous but reversed effects are produced in the other part of the transmitter device—44, 46, 48, 50, 52, 54, 56 by clockwise deflection of the pointer 2. The tendency of the wheels 47, 51 or 48, 52 to rotate under the influence of the friction of the pawls is counter-acted by the friction of the shafts in their bearings. In this example the toothed wheels 51 and 52 are not subjected to spring action.

In the receiving apparatus a key 57 (connected by wireless or wire, neither being shown in the drawings, with the keys 25, 30 and 35) responds to the long and short current impulses and actuates a lever 58 pivoted at 59 and a lever 72 pivoted at 73. The lever 58 has rigid arms 60 and 61 (Fig. 10) which co-operate with short teeth 63 on a wheel 62 actuated by a spring 101 in such a manner, that at the beginning and termination of each transmission period, the wheel 62 is rotated anti-clockwise through an angle corresponding to the width of a tooth. When a plurality of short signals are transmitted to the wheel 62, the same makes a continuous anti-clockwise rotation of uniform angular speed. The wheel 62 is provided with a crank pin 64 carrying a pawl 65. In the course of anti-clockwise rotation of wheel 62 the pawl 65 releases the ratchet wheel 66 and the spur wheel 67 mounted on the same shaft 68, and the wheel 67 is rotated by a spring 102 through an angle proportional to the number of short signals. By its rotation it actuates the spur wheel 70 with the pointer 69 working on the stationary scale 86.

Short signals cause the arm 87 of the lever 72 to release the cam wheel 74 (Fig. 9) which, by means of a spring 103 is rotated anti-clockwise through a small angle; the speed of the wheel 74 is such that at the termination of the short signal the arm 87 is still in contact with the nearest inclined part of the cam surface, whereby the wheel 74 is turned by 87 in the reverse direction through a corresponding distance. The action of the lever at the termination of the signal is assisted by a counter-weight 88 on the other end of the lever arm. On the shaft 71 which carries the wheel 74 there are mounted a spur wheel 76 and cam 77, which during the reception of short signals are rotated through a small angle. This causes the part 89 of the cam 77, to move the lever 79 pivoted at 78 to position $79^1$. This operation causes the spur wheel 82 rotatably mounted on the shaft 81 to be lifted into the position $82^1$, and the spur wheel 85 mounted on the same shaft to be lifted into the position $85^1$, in which positions the spur wheels 82 and 85 are not brought into engagement with the spur wheels 76 and 84 respectively. Upon termination of the short signal and the consequent reverse rotation of the wheels 74, 76, 77 the lever $79^1$ and shaft 81, with the spur wheels $82^1$ and $85^1$ drop back into their original positions 81, 82, 85, assisted by the weight 80 attached to the lever 79.

Under the influence of long current impulses (dash transmission) the arm 87 of the lever 72 releases the cam 74 for a period sufficient to allow the said wheel to rotate anti-clockwise through an angle corresponding to one swell of the cam. The cam part then lifts by means of the lever 79 the shaft 81 with the wheels 82 and 85, from the positions $81^1$, $82^1$, $85^1$ into the positions $81''$, $82''$, $85''$ and maintains them in this position for the time, required by the wheels 74 and 77 to complete their rotation to the extent of one cam swell, whereupon they drop back into the positions 81, 82, 85.

In the positions 82'', 85'' these wheels mesh with the spur wheels 76 and 84 respectively; the wheel 84 is rotatably mounted on a shaft 83 and engages the spur wheel 67. A short signal produced by anti-clockwise deflection of the pointer in the transmitter device, rotates the cam 74 and the spur wheel 76 anti-clockwise, consequently rotating the lifted spur wheels 82 and 85 clockwise, the wheel 84 anti-clockwise, the wheel 67 clockwise and the wheel 70 with the pointer 69 anti-clockwise, so that the deflection of the pointer of the receiver device is in accordance with that of the pointer of the transmitter device. In the case of long signals, the teeth of the ratchet wheel 66 slide past the pawl 65, without actuating the wheel 62, which in addition is locked by the lever arm 61¹. The toothed wheel 62 is caused to travel through an angle corresponding to the width of one tooth by the closure of the circuit and is then retained for the duration of the transmission by means of the arm 61¹; at the termination the other arm 60¹ of the lever 58¹ effects a further rotation to the left to the extent of the length of one tooth, and thereafter in its position 60 locks the wheel 62. The length of the cam curves 75 of the wheel 74 and of the teeth 89 of wheel 77, and the speed of the spring actuated wheel 74, are so proportioned that the anti-clockwise rotations of the wheel 67 and the clockwise deflections of the pointer 69 effected at the start and at the termination of a prolonged closure of the circuit, are reversed, while moreover a left hand deflection of the pointer 69 is performed corresponding to the amplitude of deflection in the transmitter device. The toothed wheel 77 acts with its gradually rising teeth 89 in such a manner upon the coupling device 78 to 85, that an anti-clockwise deflection of the pointer 69 is only then effected, when the short clockwise deflection of the pointer 69, produced at the start of the current impulse by means of the toothed wheel 62 responding to the short current impulses, has already been completed. The pointer movement in clockwise direction follows therefore upon the anti-clockwise movement, so that in no circumstances do the two opposing movements influence the pointer 69 simultaneously.

The importance of the invention in connection with various branches of technics will be recognized. Applied to electric distributing systems it makes for efficiency and avoidance of interruptions by keeping the central station constantly informed as to conditions in all parts of the system. The same applies to many other services controlled from central stations, for example to electrically operated railway systems, where it is important to make quick local adjustments for varying load requirements and so on. Hydraulic power distributing systems afford another example.

In consonance with the foregoing disclosure, the term single circuit used in the claims is meant to include either such a wired circuit or the equivalent single frequency radio or wireless circuit.

What I claim as my invention and desire to secure by Letters Patent of the United States is:—

1. In a system of indicating movements at a distance employing a single electrical circuit, sending apparatus comprising an actuating member capable of movement of varying length in alternative directions, a single circuit, means for causing movement of the actuating member in one direction to generate a series of impulses in said circuit of a given duration and frequency together with means for causing movement of the actuating member in the opposite direction to generate in said circuit a series of impulses of a different duration, but of the same frequency as the first mentioned impulses, the number of impulses generated in each series being proportional to the extent of movement of the actuating member in the corresponding direction.

2. In a system of indicating movements at a distance, sending apparatus in accordance with claim 1, comprising a train of gears, means whereby said actuating member operates said train of gears in one direction only, a second train of gears, means whereby said actuating member operates said second train in the reverse direction only, means for producing impulses in said circuit actuated by each of said gear trains, the number of impulses being determined by the amount of movement of said actuating member, means whereby one of said trains produces impulses of a greater duration than the other, the time rate of the impulses of each set being the same.

3. In a system of indicating movements at a distance, sending apparatus in accordance with claim 1, comprising a train of gears, means whereby said actuating member operates said train of gears in one direction only, a second train of gears, means whereby said actuating member operates said second train in the reverse direction only, means for producing impulses of different duration in said circuit actuated by each of said gear trains, each of said trains comprising clockwork and stops therefor removable for periods varying according to the amplitude of the movement of the actuating member.

4. In a system of indicating movements at a distance, sending apparatus in accordance with claim 1, comprising a train of gears, means whereby said actuating member operates said train of gears in one direction only, a second train of gears, means whereby said actuating member operates said second train in the reverse direction only means for producing impulses of different duration in said circuit actuated by each of said gear trains, each of said trains comprising clockwork and stops therefor removable for periods varying according to the amplitude of the movement of the actuating member, said stops and associated mechanism each including an eccentrically mounted disc and a curved abutment adapted to move same into operative arrangement with certain of said gear train.

In witness whereof I have signed this specification.

Dr. Ing. HANS DREYER.